(12) United States Patent
Harth et al.

(10) Patent No.: US 10,633,134 B2
(45) Date of Patent: Apr. 28, 2020

(54) ROTARY-TYPE MACHINE AND METHOD FOR SEALING FOIL BAGS

(71) Applicant: INDAG Pouch Partners GmbH, Eppelheim (DE)

(72) Inventors: Rolf Harth, Neckargemünd (DE); Frank Lechert, Weinheim (DE); Daniel Schwab, Heidelberg (DE)

(73) Assignee: INDAG POUCH PARTNERS GMBH, Eppelheim (DE)

( * ) Notice: Subject to any disclaimer, the term of this patent is extended or adjusted under 35 U.S.C. 154(b) by 422 days.

(21) Appl. No.: 15/499,155

(22) Filed: Apr. 27, 2017

(65) Prior Publication Data

US 2017/0313458 A1 Nov. 2, 2017

(30) Foreign Application Priority Data

Apr. 29, 2016 (EP) .................................. 16167727

(51) Int. Cl.
*B65B 51/00* (2006.01)
*B65B 7/00* (2006.01)
*B29C 65/00* (2006.01)
*B65B 51/22* (2006.01)
*B29C 65/08* (2006.01)
*B65B 51/14* (2006.01)
*B65B 7/02* (2006.01)
(Continued)

(52) U.S. Cl.
CPC .......... *B65B 51/225* (2013.01); *B29C 65/086* (2013.01); *B29C 66/1122* (2013.01);
(Continued)

(58) Field of Classification Search
CPC ......... B65B 51/00; B65B 51/10; B65B 51/14; B65B 51/146; B65B 51/20; B65B 51/22; B65B 51/225; B65B 7/00; B65B 7/02; B29C 65/00; B29C 65/08; B29C 65/086; B29C 66/00; B29C 66/10; B29C 66/11; B29C 66/112; B29C 66/1122; B29C 66/40; B29C 66/43; B29C 66/431; B29C 66/4312; B29C 66/43121; B29C 66/80; B29C 66/81; B29C 66/814; B29C 66/8146; B29C 66/81463; B29C 66/83; B29C 66/834;
(Continued)

(56) References Cited

FOREIGN PATENT DOCUMENTS

DE  102010039000 A1  2/2012
EP  1388494 A2  2/2004
(Continued)

OTHER PUBLICATIONS

EP16167727.3; European Search Report; dated Nov. 8, 2016, pp. 1-7.

*Primary Examiner* — Jacob T Minskey
*Assistant Examiner* — Matthew Hoover
(74) *Attorney, Agent, or Firm* — Mayer Brown LLP

(57) ABSTRACT

The present invention provides, in various embodiments, a rotary-type machine (M) for continuously sealing individual foil bags (B) by way of ultrasonic welding between an anvil (6) and a sonotrode (5) in at least one welding station (S) of a carousel (1), where each foil bag (B) can be positioned by way of holders (11). In some embodiments, the rotary-type machine (M) comprises at least one welding station (S) composed of a sonotrode (5) being located stationary at least relative to the direction of circulation (8) and anvils (6) which with intermediate spacings (7) rotate past said sonotrode (5) successively in the direction of circulation (8) of the carousel (1). According to the invention, the foil bags (B) are sealed at the stationary sonotrode (5) when the anvils (6) equipped with the foil bags (B) are rotated past.

14 Claims, 3 Drawing Sheets

(51) Int. Cl.
  *B65B 43/50* (2006.01)
  *B29L 31/00* (2006.01)
(52) U.S. Cl.
  CPC .. *B29C 66/43121* (2013.01); *B29C 66/81463* (2013.01); *B29C 66/83411* (2013.01); *B29C 66/83511* (2013.01); *B29C 66/849* (2013.01); *B29C 66/8491* (2013.01); *B29C 66/9321* (2013.01); *B29C 66/951* (2013.01); *B65B 7/02* (2013.01); *B65B 51/146* (2013.01); *B29C 66/81422* (2013.01); *B29C 66/81423* (2013.01); *B29C 66/929* (2013.01); *B29C 66/92445* (2013.01); *B29C 66/92611* (2013.01); *B29C 66/92615* (2013.01); *B29C 66/939* (2013.01); *B29C 66/9513* (2013.01); *B29L 2031/712* (2013.01); *B29L 2031/7128* (2013.01); *B65B 43/50* (2013.01)

(58) Field of Classification Search
  CPC ........... B29C 66/8341; B29C 66/83411; B29C 66/835; B29C 66/8351; B29C 66/83511; B29C 66/84; B29C 66/849; B29C 66/8491; B29C 66/90; B29C 66/93; B29C 66/932; B29C 66/9321; B29C 66/95; B29C 66/951
  See application file for complete search history.

(56) References Cited

FOREIGN PATENT DOCUMENTS

| | | |
|---|---|---|
| EP | 2147774 A1 | 1/2010 |
| EP | 2808154 A1 | 12/2014 |
| EP | 2944577 A1 | 11/2015 |
| EP | 2993138 A2 | 3/2016 |

ROTARY-TYPE MACHINE AND METHOD FOR SEALING FOIL BAGS

RELATED APPLICATIONS

This application claims the benefit of, and priority to, European Patent Application No. 16167727.3, filed Apr. 29, 2016, which is incorporated by reference herein in its entirety.

BACKGROUND

Various methods for continuously sealing foil bags, for example, after they have been cold or hot filled with a beverage, are known. Improved systems and methods for sealing foil bags are needed in the art.

SUMMARY

The present disclosure provides, in various embodiments, a rotary-type machine and method for continuously sealing foil bags.

In some embodiments, the invention provides a rotary-type machine comprising a rotary-type filler for continuously sealing individual foil bags by way of ultrasonic welding between an anvil and a sonotrode in at least one welding station associated with a rotationally driven carousel, wherein each foil bag can during circulation be positioned by way of holders, wherein said rotary-type machine has at least one welding station comprising a sonotrode positioned stationary relative to a direction of circulation of said carousel, and anvils which are with intermediate spacings rotatable past said sonotrode successively in the direction of circulation of said carousel and on which said foil bags are positioned.

In some embodiments, dummy anvils co-rotating in said intermediate spacings between said anvils are arranged in said carousel, wherein each dummy anvil facing a welding side of said sonotrode has a contour K' which matches a contour K of an outer side of said anvil with said foil bag positioned thereon facing said sonotrode, and wherein said anvils and said dummy anvils are arranged with said contours K, K' aligned in the direction of circulation.

In some embodiments, said foil bag is positioned on said anvil substantially symmetrically and is in the direction of circulation shorter than said anvil, and wherein a welding side of said sonotrode is shorter than said foil bag.

In some embodiments, a welding side of said sonotrode faces an outer side of each anvil from outside said carousel, wherein said outer side of said anvil follows a circular arc at least approximately with a radius toward the center of said carousel, and wherein said welding side of said sonotrode is planar or concave.

In some embodiments, said welding side of said sonotrode faces said outer side of said anvil from outside said carousel, and wherein said contours K' of two dummy anvils adjoining a respective anvil comprise steps at each end, each step having a depth y of about the thickness of a foil bag and a spacing x from the end of said dummy anvil of about half the difference in the length between said foil bag and said anvil.

In some embodiments, said welding side of said sonotrode and said outer sides of said anvils and said dummy anvils are circular arcs following at least approximately a radius toward the center of said carousel.

In some embodiments, a welding side of said sonotrode at least at the end facing against the direction of circulation of said carousel comprises an infeed rounding or an infeed bevel, and wherein said anvils and said intermediate spacings are of the same length in the direction of circulation.

In some embodiments, said welding side of said sonotrode at least at the end facing against the direction of circulation of said carousel comprises an infeed rounding or an infeed bevel, and wherein said anvils and said dummy anvils are of the same length in the direction of circulation.

In some embodiments, at least one rotary angle sensor is provided for said carousel and connected to a control unit at least for the welding power of said sonotrode.

In some embodiments, said sonotrode is adjustable via a drive motor substantially radially to said carousel between a retracted position and a welding position that is approached to said anvils. In some embodiments, the drive motor comprises a stepping motor and a spring. In some embodiments, said sonotrode is adjustable by way of a control unit connected to a rotary angle sensor of said carousel.

In some embodiments, said sonotrode is with its welding side positioned radially stationary relative to said carousel in a welding position.

In some embodiments, the invention provides a method for continuously sealing individual foil bags in a carousel of a rotary-type machine by way of ultrasonic welding between a sonotrode and an anvil in at least one welding station associated with said carousel, wherein a number of successively positioned anvils, on each of which a foil bag is positioned, corresponding to the number of foil bags in said carousel is in a direction of circulation of said carousel with intermediate spacings rotated past a sonotrode of at least one welding station positioned stationary relative to the direction of rotation, said foil bags thereby being sealed.

In some embodiments, a dummy anvil is arranged in each intermediate spacing between two anvils and has a contour K' facing said sonotrode that matches a contour K of said anvil with said foil bag positioned thereon, and wherein a welding power is temporarily reduced when said dummy anvil is rotated past said sonotrode as compared to the welding power when said anvil is rotated past.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of the preferred embodiments of the application, will be better understood when read in conjunction with the appended drawings. For the purposes of illustrating the systems and methods of the present application, there are shown in the drawings preferred embodiments. It should be understood, however, that the application is not limited to the precise arrangements and instrumentalities shown. In the drawings.

DETAILED DESCRIPTION

Figure 1:
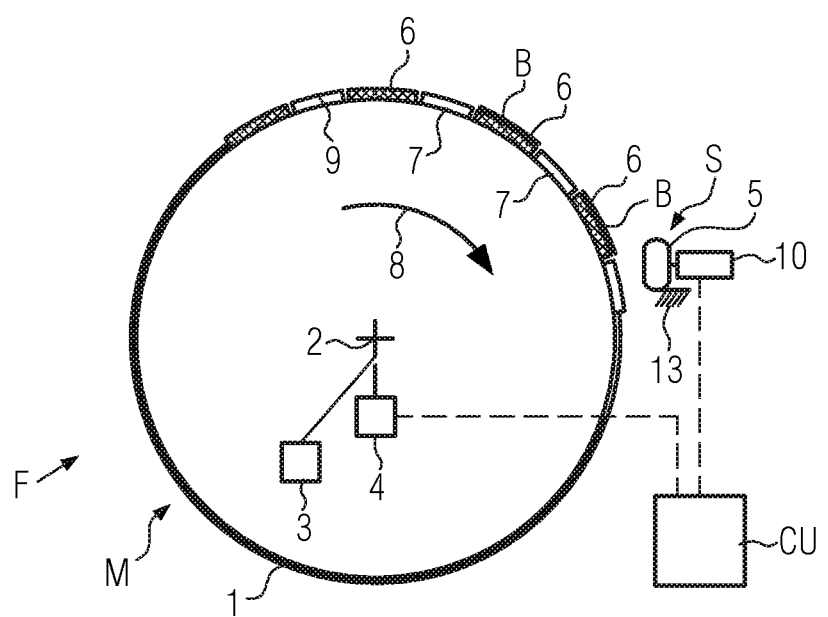
FIG. 1 shows a schematic view of an exemplary rotary-type machine with only one welding station, according to some embodiments of the invention.

Continuously sealing foil bags, for example, after they have been cold or hot filled with a beverage, between an anvil and a sonotrode associated therewith by way of ultrasonic welding in a rotary-type machine is known. The carousel comprises as many welding stations, composed of an anvil and a sonotrode, as foil bags are processed in the carousel. The object of the invention is to specify a rotary-type machine of the type mentioned at the outset as well as a method for sealing foil bags in a continuous circulation with which foil bags can be sealed continuously with high operational reliability and largely without malfunction while the structural complexity is low.

The object posed is satisfied by the features of the rotary-type machine and the method for continuously sealing individual foil bags described below. Since possibly only one sonotrode or far fewer sonotrodes than anvils are required, the structural complexity is reduced considerably. The sonotrode being placed in a stationary manner at least relative to the direction of circulation can be configured or controlled such that threading-in the front end of the foil bag positioned on the anvil does not lead to any system malfunction.

According to the method, at least one stationary sonotrode cooperates with a plurality of anvils that rotate past the former and deliver the foil bags, where the energy input is reduced and all foil bags of high quality are nevertheless sealed.

In an advantageous embodiment with independent inventive significance, dummy anvils are arranged in the carousel in the intermediate spacings between the anvils, where, however, each dummy anvil facing a welding side of the sonotrode has a contour which matches a contour of the anvil with the foil bag positioned thereon facing the sonotrode. The contours of the anvils and of the dummy anvils are arranged flush in the direction of circulation such that sealing is effected like in the case of a continuous foil feed and threading the ends of the foil bags that are in the direction of circulation at the front between the sonotrode and the anvil does not cause any malfunction. The sonotrode can even be placed in a stationary manner relative to the direction of circulation and radial to the carousel.

For perfect sealing, it can be advantageous to have the foil bag in the direction of circulation be shorter than the anvil and positioned on the latter at least substantially symmetrically. Furthermore, preferably the welding side of the sonotrode can be shorter than the foil bag.

A welding side of the sonotrode is there advantageously facing the contour of each anvil from outside the carousel. The outer side of the anvil, on which the foil bag is placed, can follow a circular arc at least approximately having the radius to the center of the carousel. The welding side of the sonotrode, on the other hand, can be flat or respectively be curved in a concave manner.

With regard to the matching contours and malfunction-free threading of the front end of the foil bag, it can be advantageous to have the welding side of the sonotrode face the outer side of the anvil from outside the carousel and the contours of the two dummy anvils adjoining a respective anvil comprise steps at the end side having a thickness corresponding approximately to the depth of a foil bag, each of which in the direction of circulation having a spacing from the end of the dummy anvil which corresponds approximately to half the difference in the length between the foil bag and the anvil. Threading the front end of the foil bag in a malfunction-free manner is promoted by the steps.

In the embodiment with the anvils and the dummy anvils acting as a placeholders, the welding side of the sonotrode and the outer sides of the anvils and the dummy anvils can be circular arcs formed following at least approximately with the radius to the center of the carousel. This results in a uniform gap width for the uniform transfer of the welding power.

In order to exclude malfunctions when the end of the foil bag, in the infeed direction being at the front, is threaded between the sonotrode and the anvil, it is according to a particularly important aspect advantageous to have the welding side of the sonotrode at least at the end facing against the direction of circulation comprise an infeed rounding or an infeed bevel. This creates a beak narrowing in the direction of circulation, into which the front end of the foil bag is easily fed. In addition, the anvils and the dummy anvils or the anvils and the intermediate spacings can in the direction of circulation be of the same length.

In an advantageous embodiment, at least one rotary angle sensor is provided for the carousel and is linked to a control unit at least for the welding power of the sonotrode. The control unit is via the rotary angle sensor informed as to whether and where a foil bag to be sealed is located, for example, in order to then regulate the welding power accordingly. When using a high-quality electric servomotor, the rotary angle information of which is known, the servo motor, instead of a rotary angle sensor, can supply the information on the rotation angle.

In order to prevent problems when threading the front end of the foil bag between the sonotrode and the anvil, the sonotrode can be adjustable by way of a drive motor, for example, a stepping motor, for example, against a spring force, substantially radially to the carousel between a retracted position (when a dummy anvil or the intermediate spacing rotates past) and a welding position approached toward the anvils. This adjustment can preferably also be effected by way of the control unit and with the information provided by the rotary angle sensor. This embodiment is advantageous in the case of free intermediate spacings between the anvils.

In another embodiment, the sonotrode can in the welding position also be positioned radially stationary relative to the carousel, which significantly reduces the complexity of the welding station. This can be advantageous for the embodiment with the dummy anvils in which threading the front ends of the foil bags is trouble-free inter alia due to the same contours on the anvils and the dummy anvils.

In a further method variant, the welding power can, when each dummy anvil is rotated past the sonotrode or also when an intermediate space is rotated past, be temporarily reduced as compared to the welding power when the anvil delivering the foil bag is rotated past.

FIG. 1 is a schematic top view of a rotary-type machine M, for example, of a rotary-type filler F, for continuously (filling and) sealing foil bags B, for example, for beverages or other foodstuffs. Foil bags B do not have fill-in or pour-out members in the region of the opening edges of the foil bag to be sealed and are sealed by ultrasonic welding between presently only one sonotrode 5 and one respective anvil 6. Several welding stations S could there be distributed around the circumference of a carousel 1 of rotary-type machine M, but less than anvils 6 in carousel 1.

Carousel 1 is continuously driven about an axis 2, for example, by an electric servomotor 3. A rotary angle sensor 4 can there be provided and linked to a control unit CU to supply rotation angle information.

The sonotrode 5 is arranged to be stationary relative to the carousel 1 at least in the direction of circulation 8, so that when carousel 1 rotates, anvils 6, having the foil bags B positioned thereon and being arranged with intermediate spacings 7 along the circumference, are rotated past sonotrode 5.

Intermediate spacings 7 of FIG. 1 can be free, as shown, for example, in FIGS. 2 and 3, or can contain dummy anvils 9 as placeholders, as explained with reference to FIG. 4.

Figure 2:
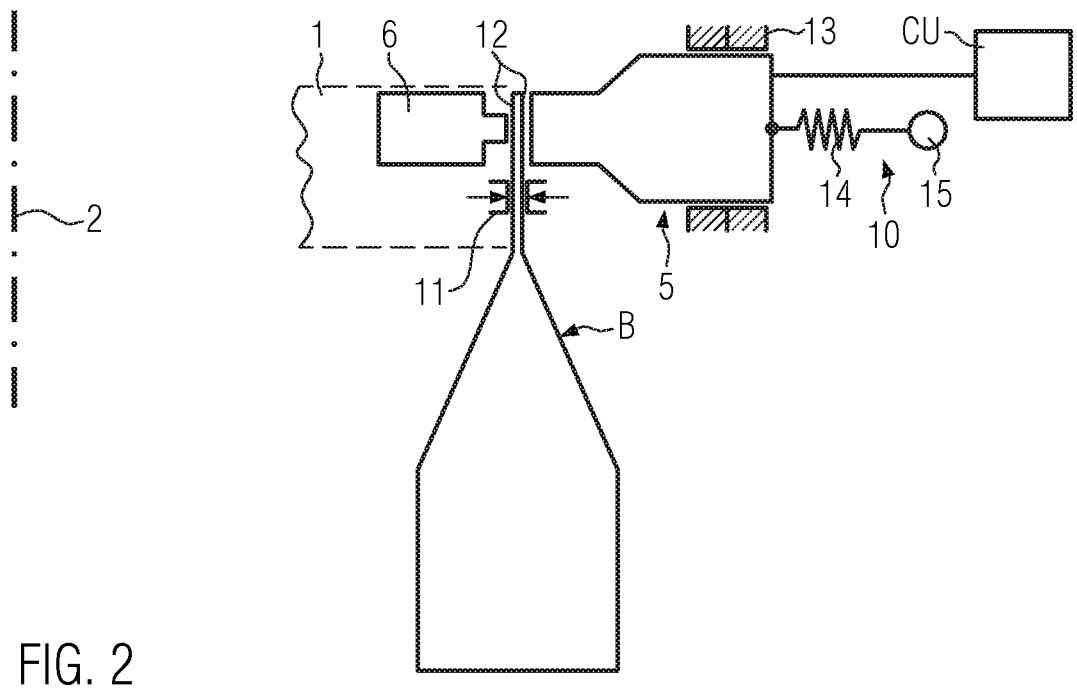
FIG. 2 shows a view of an exemplary welding station in the direction of circulation.
Figure 3:
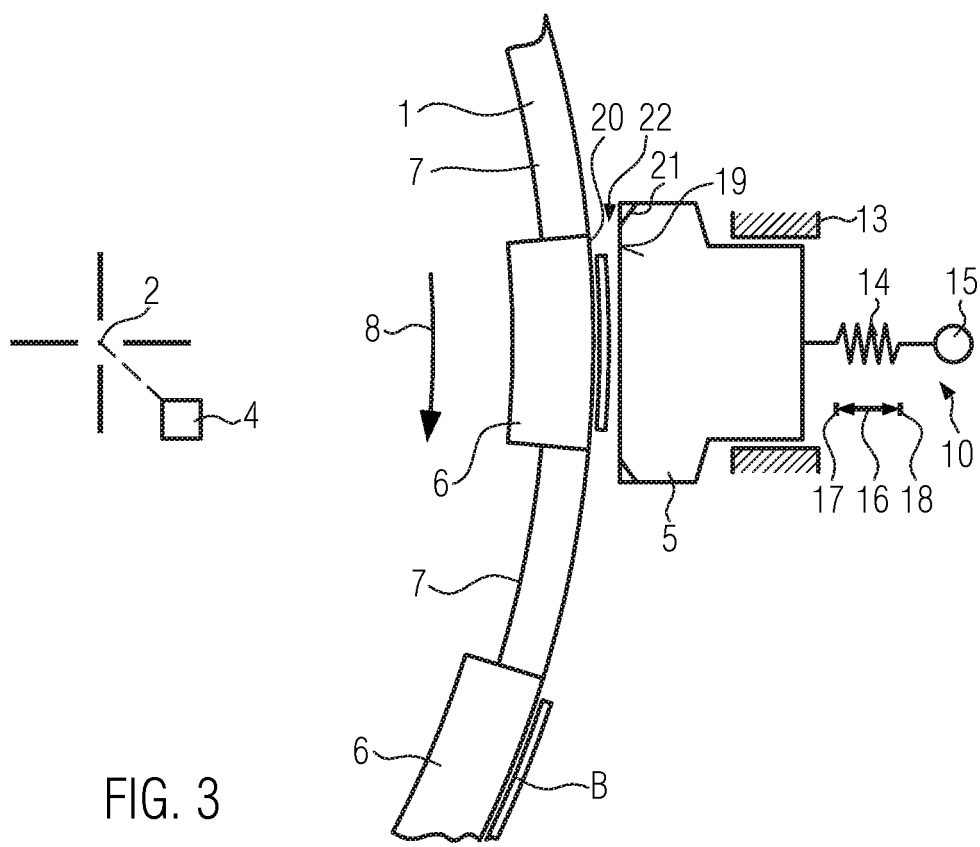
FIG. 3 shows a schematic view of FIG. 2.

In the embodiment in FIG. 1, sonotrode 5 having a stationary support 13 comprises, for example, a drive 10 which is actuatable for example by control unit CU, and adjusts sonotrode 5 to and fro, for example, approximately radially relative to carousel 1 (FIGS. 2 and 3).

Control unit CU can optionally also regulate and/or vary the welding power of sonotrode 5.

It is in the schematic detail views of FIGS. 2 and 3 evident that each foil bag B is with its opening edges 12 positioned on anvil 6 by way of holder 11 of carousel 1 and suspended downwardly therefrom. Sonotrode 5 is in mounting 13, being stationary with respect to the direction of circulation 8, adjustable approximately radially relative to carousel 1, namely, for example, by way of a motor 15, such as a stepping motor, and optionally a spring 14 as drive 10, and in particular according to FIG. 3 in the direction of a double arrow 16 between a welding position 17 approached to anvil 6 toward a retracted position 18.

Outer side 20 of each anvil 6 can follow a circular arc with a radius toward axis 2. A welding side 19 of sonotrode 5 can be either planar (as shown in FIG. 3) or curved (not shown) in a concave manner following a circular arc.

An infeed rounding 21 or an infeed bevel is advantageously formed at least on the end of welding side 19 of sonotrode 5 facing against the direction of circulation 8, so that a beak 22 is for the front end of foil bag F formed narrowing in the direction of circulation 8 in the gap between anvil 6 and sonotrode 5. Intermediate spacings 7 between each two successive anvils 6 can remain free. Intermediate spacings 7 and anvils 6 can be of the same length. Foil bag B is shorter than outer side 20 of anvil 6 and is positioned substantially symmetrically on outer side 20 so that outer side 20 in the direction of circulation 8 protrudes toward the rear and the front beyond foil bag B. Welding side 19 of sonotrode 5 is shown in FIG. 3 to be e.g. longer than outer side 20 of anvil 6, respectively viewed in direction of circulation 8.

Sonotrode 5 can by way of motor 15 and/or spring 14 be temporarily retracted in stationary mounting 13 when an intermediate spacing 7 rotates past or shortly before threading the front end of foil bag B between anvil 6 and sonotrode 5 and then be returned to welding position 17. Furthermore, the welding power of sonotrode 5 can be temporarily reduced or switched off when the intermediate spacing is rotated past.

Figure 4:
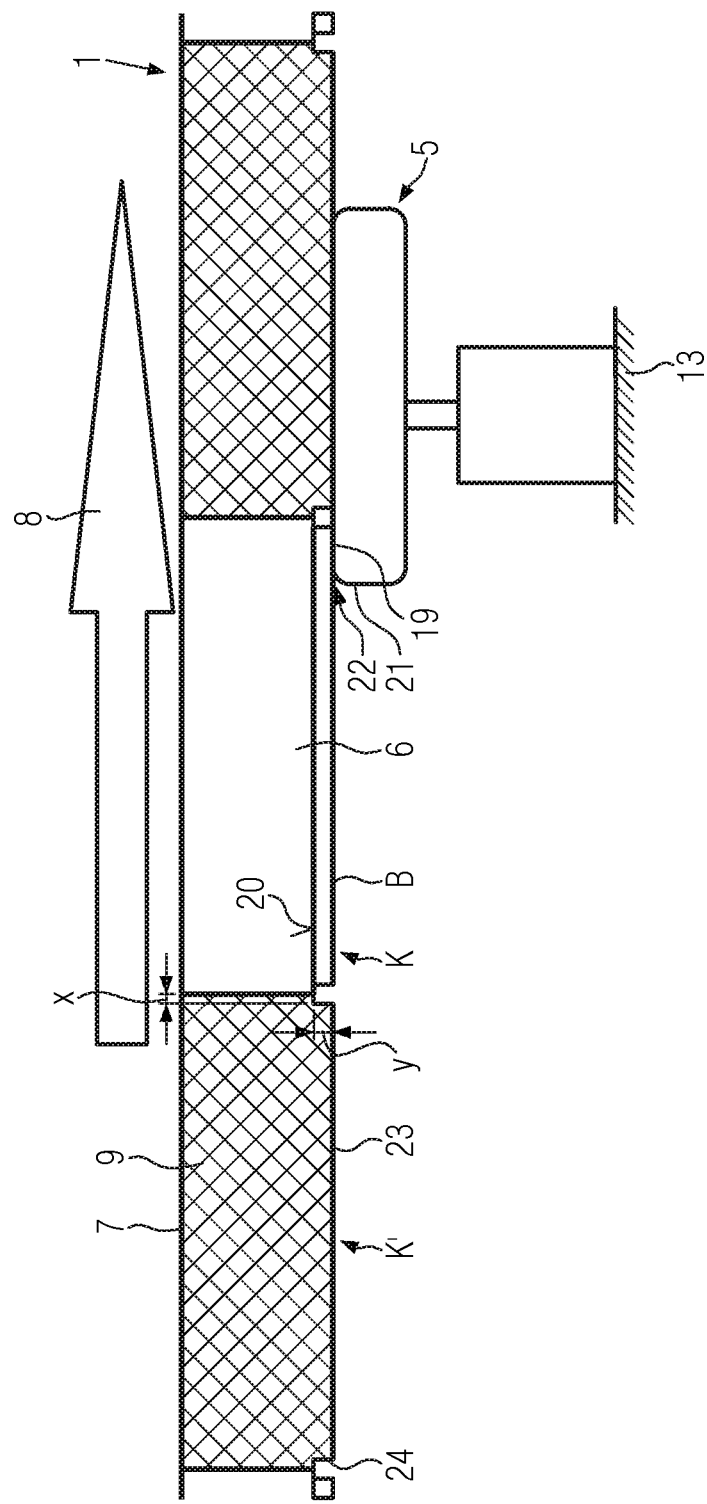
FIG. 4 shows a further embodiment with anvils and straight dummy anvils located therebetween in a schematic view as a developed view of the round carousel circumference.

In the embodiment in FIG. 4, dummy anvils 9 are arranged as placeholders in intermediate spacings 7. Dummy anvils 9 and anvils 6 can there be of the same length and follow for example in substantially transition-free sequence. The sonotrode can there also in the radial direction be arranged stationary relative to carousel 1, for example, in mounting 13.

An essential aspect of the embodiment of FIG. 4 is that each dummy anvil 9 with its outer side 23 has a contour K' which matches the contour K of anvil 6 with the foil bag B positioned on outer side 20, where contours K' and K are in the turning direction of circulation 8 aligned with one another. It is there recommended to provide on welding side 19 of sonotrode 5 an infeed rounding 21 which defines beak 22 for threading foil bags B in a malfunction-free manner.

Contour K' of each dummy anvil 9 is defined by an outer side 23, which, for example, follows a circular arc (not shown) having a radius relative to center 2 of carousel 1, and a step 24 at each end of dummy anvil 9. Step 24 can have a depth y corresponding to the thickness of foil bag B, and a spacing x from the end of dummy anvil 9 corresponding approximately to half the difference in the length between foil bag B and anvil 6.

Alternatively, sonotrode 5 can in the embodiment in FIG. 4 also be adjusted to and fro, like in FIGS. 2 and 3, for example, when a dummy anvil 9 is rotated past. The mounting of sonotrode 5, being stationary relative to the direction of circulation 8 and radial, is advantageous because the additional drive 10 and its control unit are omitted.

In the embodiment in FIG. 4, for example, the carousel can rotate at a rotational speed from which a relative speed of more than 10 m per minute is obtained. The sonotrode can be operated, for example, with a power of 600 watts or more and at a frequency of 35 kHz or more.

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. For example, any feature(s) in one or more embodiments may be applicable and combined with one or more other embodiments. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

What is claimed is:

1. A rotary-type machine comprising a rotary-type filler for continuously sealing individual foil bags by way of ultrasonic welding between an anvil and a sonotrode in at least one welding station associated with a rotationally driven carousel, wherein each foil bag can during circulation be positioned by way of holders, wherein said rotary-type machine has at least one welding station comprising a sonotrode positioned stationary relative to a direction of circulation of said carousel, and anvils which are with intermediate spacings rotatable past said sonotrode successively in the direction of circulation of said carousel and on which said foil bags are positioned; wherein dummy anvils co-rotating in said intermediate spacings between said anvils are arranged in said carousel, wherein each dummy anvil facing a welding side of said sonotrode has a contour K' which matches a contour K of an outer side of said anvil with said foil bag positioned thereon facing said sonotrode, and wherein said anvils and said dummy anvils are arranged with said contours K, K' aligned in the direction of circulation.

2. The rotary-type machine according to claim 1, wherein said foil bag is positioned on said anvil substantially symmetrically and is in the direction of circulation shorter than said anvil, and wherein a welding side of said sonotrode is shorter than said foil bag.

3. The rotary-type machine according to claim 1, wherein a welding side of said sonotrode faces an outer side of each anvil from outside said carousel, wherein said outer side of said anvil follows a circular arc at least approximately with a radius toward the center of said carousel, and wherein said welding side of said sonotrode is planar or concave.

4. The rotary-type machine according to claim 1, wherein said welding side of said sonotrode faces said outer side of said anvil from outside said carousel, and wherein said contours K' of two dummy anvils adjoining a respective anvil comprise steps at each end, each step having a depth y of about the thickness of a foil bag and a spacing x from the end of said dummy anvil of about half the difference in the length between said foil bag and said anvil.

5. The rotary-type machine according to claim 1, wherein said welding side of said sonotrode and said outer sides of said anvils and said dummy anvils are circular arcs following at least approximately a radius toward the center of said carousel.

6. The rotary-type machine according to claim 1, wherein a welding side of said sonotrode at least at the end facing against the direction of circulation of said carousel comprises an infeed rounding or an infeed bevel, and wherein said anvils and said intermediate spacings are of the same length in the direction of circulation.

7. The rotary-type machine according to claim 1, wherein said welding side of said sonotrode at least at the end facing against the direction of circulation of said carousel comprises an infeed rounding or an infeed bevel, and wherein said anvils and said dummy anvils are of the same length in the direction of circulation.

8. A rotary-type machine according to claim 1, wherein at least one rotary angle sensor is provided for said carousel and connected to a control unit at least for the welding power of said sonotrode.

9. The rotary-type machine according to claim 1, wherein said sonotrode is adjustable via a drive motor substantially radially to said carousel between a retracted position and a welding position that is approached to said anvils.

10. The rotary-type machine according to claim 9, wherein the drive motor comprises a stepping motor and a spring.

11. The rotary-type machine according to claim 10, wherein said sonotrode is adjustable by way of a control unit connected to a rotary angle sensor of said carousel.

12. The rotary-type machine according to claim 1, wherein said sonotrode is with its welding side positioned radially stationary relative to said carousel in a welding position.

13. The rotary-type machine according to claim 1, wherein said sonotrode is with its welding side positioned radially stationary relative to said carousel in a welding position.

14. A method for continuously sealing individual foil bags in a carousel of a rotary-type machine by way of ultrasonic welding between a sonotrode and an anvil in at least one welding station associated with said carousel, wherein a number of successively positioned anvils, on each of which a foil bag is positioned, corresponding to the number of foil bags in said carousel is in a direction of circulation of said carousel with intermediate spacings rotated past a sonotrode of at least one welding station positioned stationary relative to the direction of rotation, said foil bags thereby being sealed; wherein a dummy anvil is arranged in each intermediate spacing between two anvils and has a contour K' facing said sonotrode that matches a contour K of said anvil with said foil bag positioned thereon, and wherein a welding power is temporarily reduced when said dummy anvil is rotated past said sonotrode as compared to the welding power when said anvil is rotated past.

\* \* \* \* \*